United States Patent
Secondi et al.

(10) Patent No.: US 12,319,308 B2
(45) Date of Patent: Jun. 3, 2025

(54) METHOD FOR THE DRIVER ASSISTANCE OF A ROAD VEHICLE

(71) Applicant: FERRARI S.P.A., Modena (IT)

(72) Inventors: Andrea Secondi, Modena (IT); Gianmarco Limonta, Modena (IT)

(73) Assignee: FERRARI S.p.A., Modena (IT)

( * ) Notice: Subject to any disclaimer, the term of this patent is extended or adjusted under 35 U.S.C. 154(b) by 171 days.

(21) Appl. No.: 18/177,948

(22) Filed: Mar. 3, 2023

(65) Prior Publication Data

US 2023/0286528 A1    Sep. 14, 2023

(30) Foreign Application Priority Data

Mar. 10, 2022   (IT) ........................ 102022000004610

(51) Int. Cl.
*B60W 50/16*       (2020.01)
*B60W 40/06*       (2012.01)

(52) U.S. Cl.
CPC ............ *B60W 50/16* (2013.01); *B60W 40/06* (2013.01); *B60W 2510/207* (2013.01); *B60W 2520/14* (2013.01)

(58) Field of Classification Search
CPC .. B60W 50/16; B60W 50/0097; B60W 40/06; B60W 40/10; B60W 2510/207; B60W 2520/10; B60W 2520/105; B60W 2520/26; B60W 2540/18; B60W 30/045; B60W 30/18172; B60W 30/18145; B60K 2360/167; B60K 35/25; B60K 35/28; B60N 2002/981

USPC ...................................................... 701/41–44
See application file for complete search history.

(56) References Cited

U.S. PATENT DOCUMENTS 11,878,679 B2 *  1/2024  Secondi ............. B60W 30/045
2019/0016347 A1   1/2019  Mergl et al.

FOREIGN PATENT DOCUMENTS

| DE | 102004030997 A1 | 1/2016 |
|----|-----------------|--------|
| DE | 102016115480 A1 | 3/2017 |
| DE | 102016215986 A1 | 6/2017 |
| EP | 1790946 A2      | 5/2007 |
| EP | 3831682 A1      | 6/2021 |
| WO | 2014027111 A1   | 2/2014 |

OTHER PUBLICATIONS

European Search Report of European Patent Application No. 23160875. 3, Date of Mailing May 7, 2023, 9 pages.
Italian Search Report for Application No. 102022000004610; Filing Date—Mar. 10, 2022; Date of Mailing—Oct. 20, 2022, 8 pages.

* cited by examiner

*Primary Examiner* — Hai H Huynh
(74) *Attorney, Agent, or Firm* — CANTOR COLBURN LLP

(57) ABSTRACT

A driver assistance method for driving a road vehicle and including the steps of: determining whether the road vehicle, while driving along a bend, is oversteering or understeering or is about to oversteer or understeer; and generating a tactile feedback, which can be perceived by a driver, if the road vehicle, while driving along the bend, is oversteering or understeering or is about to oversteer or understeer.

9 Claims, 3 Drawing Sheets

METHOD FOR THE DRIVER ASSISTANCE OF A ROAD VEHICLE

CROSS-REFERENCE TO RELATED APPLICATIONS

This application claims the priority from Italian patent application no. 102022000004610 filed on Mar. 10, 2022, the entire disclosure of which is incorporated herein by reference.

TECHNICAL FIELD

The present invention relates to a driver assistance method for driving a road vehicle.

PRIOR ART

A modern road vehicle includes several electronic driver assistance systems (for example, ABS—braking control, ASR—traction control, ESP—stability control, etc.) which allow the driver to drive the vehicle in greater safety, inasmuch as they are able to "correct" potential driving errors by intervening directly in the dynamics of the vehicle (for example, by varying the braking torque applied to the different wheels or by reducing the drive torque generated by the engine). However, current electronic driver assistance systems do not help the driver to approach (without exceeding) the limits of the road vehicle, inasmuch as they intervene autonomously (i.e. without any control of the driver) when the limits of the road vehicle are exceeded or are about to be exceeded, but provide no indication of how to approach (in safety) said limits.

Patent application DE102016216986A1 describes a method for supporting a driver driving a motor vehicle, the method using at least one vibrating device that is associated with a component that is touched by the driver while driving.

Patent application EP3831682A1 describes a driver assistance method that improves the performance of a road vehicle driven following a route.

Patent application EP1790946A2 describes an information system for detecting data regarding traffic and the conditions of a vehicle and for displaying the information on a screen in order to drive the vehicle in an optimal manner.

DESCRIPTION OF THE INVENTION

The object of the present invention is to provide a driver assistance method for driving a road vehicle which allows the driver to approach (in safety) the limits of the road vehicle.

According to the present invention, a driver assistance method for driving a road vehicle is provided in accordance with the appended claims.

The claims describe preferred embodiments of the present invention and thus constitute an integral part of the present description.

BRIEF DESCRIPTION OF THE DRAWINGS

The present invention will now be described with reference to the accompanying drawings, which illustrate a non-limiting embodiment thereof, wherein.

PREFERRED EMBODIMENTS OF THE INVENTION

Figure 1:
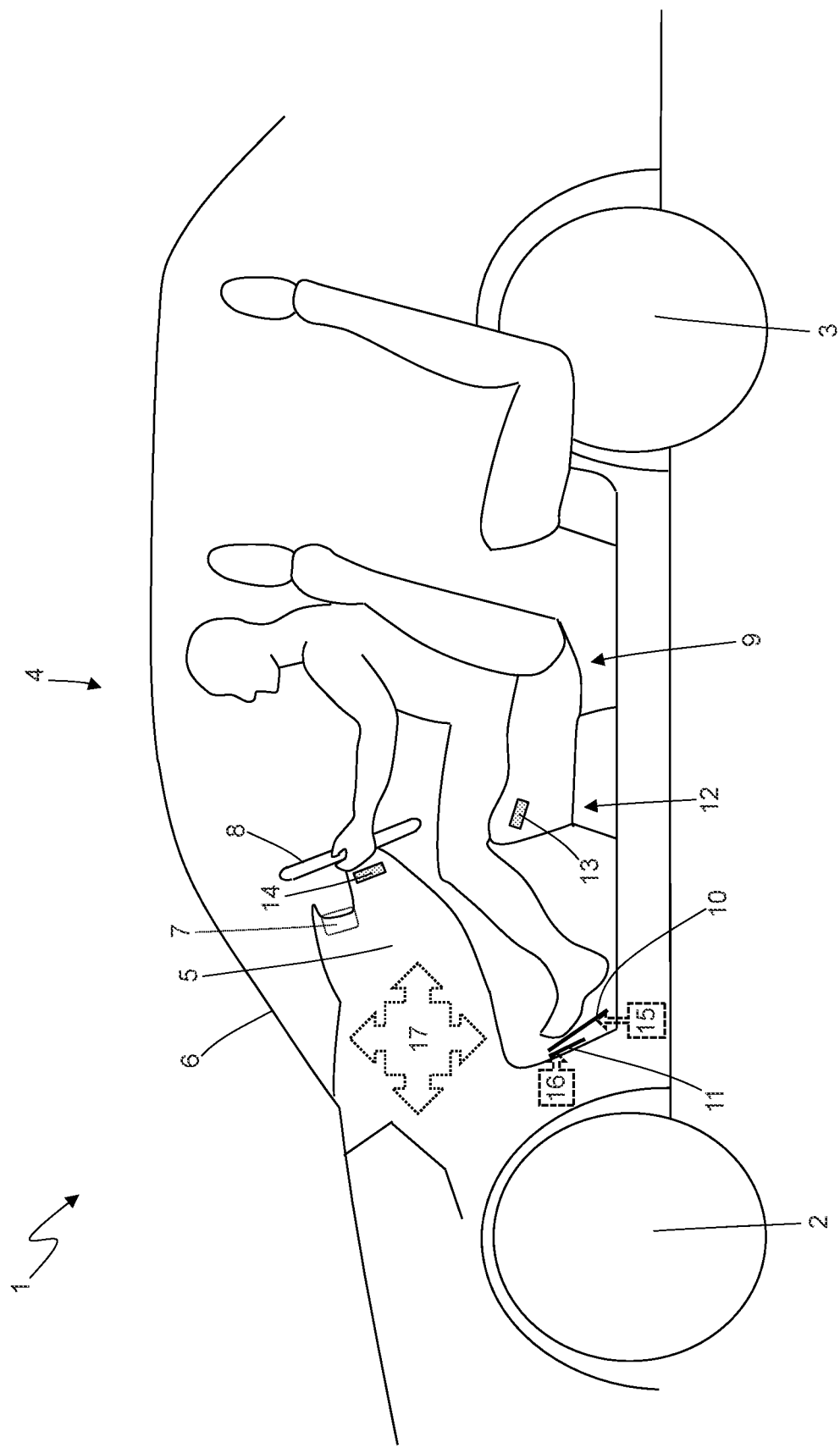
FIG. 1 is a schematic side view of a road vehicle implementing the control method of the present invention.

In FIG. 1, the reference numeral 1 indicates, as a whole, a road vehicle (in particular a car) provided with two front wheels 2, which are driven wheels and steer the vehicle, and two rear drive wheels 3, which receive the drive torque from a powertrain system (alternatively, all four wheels 2 and 3 may be drive wheels or only the two front wheels 2 may be drive wheels).

As illustrated in FIG. 1, the road vehicle 1 comprises a passenger compartment 4 delimited at the front by a dashboard 5 which is arranged below a windshield 6. The dashboard 5 supports an instrument panel 7, which is arranged in front of a driver immediately behind a steering wheel 8. Inside the passenger compartment 4, a driver's seat 9 is arranged facing the dashboard 5 and thus facing the steering wheel 8. An accelerator pedal 10 and a brake pedal 11 are arranged in the floor in front of the driver's seat 9. In other words, the steering wheel 8, the driver's seat 9 and the pedals 10 and 11 are part of a driving station of the road vehicle 1.

The driver's seat 9 comprises a seat, which is arranged essentially horizontally and on which the driver rests his or her legs, and a backrest, which is arranged essentially vertically, ends with an (integrated) headrest and against which the driver rests his or her back. Coupled to the driver's seat 9 is a signalling device 12 designed to generate mechanical vibrations of variable frequency and intensity; thus, when the signalling device 12 is activated, the driver's seat 9 vibrates in a manner that can be clearly perceived by the driver, thus generating a tactile (haptic) feedback.

Touch is the sensation that develops when the body surface (of any part of the body) comes into contact with objects that deform it, even if only at a very small point. In fact, the most superficial part of the skin, called the epidermis, contains a very dense network of free nerve fibres, i.e. the receptors, which perceive changes in pressure, i.e. the mechanical stimulus of touch. Any part of the driver's body is thus capable of perceiving tactile feedback, although there are obviously areas of the human body that are more sensitive to tactile feedback (so that milder vibrations can be sufficient) and other areas of the human body that are less sensitive to tactile feedback (so that more intense vibrations are necessary).

Figure 2:
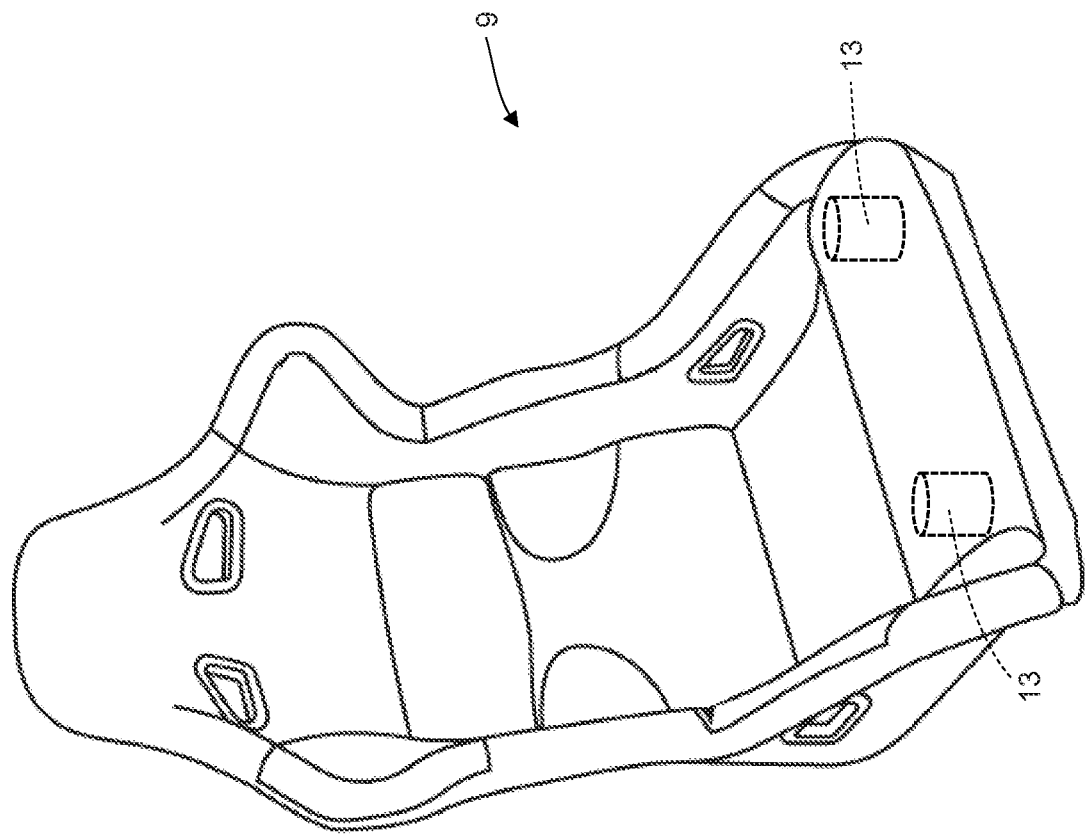
FIG. 2 is a perspective view of a driver's seat of the road vehicle of FIG. 1.

According to a preferred embodiment, the signalling device 12 comprises mechanical exciters 13 (also called "shakers") which are embedded in the driver's seat 9 and which are designed to generate mechanical vibrations of variable frequency and intensity. The number and the arrangement of the mechanical exciters inside the driver's seat 9 can be variable; the minimum configuration includes a single mechanical exciter 13 embedded in the driver's seat 9. Each mechanical exciter 13 is designed to generate vibrations that can be perceived by the driver by means of the rotation of an eccentric mass, or by means of the alternating motion (i.e. back and forth along a straight path) of a mass. In the preferred embodiment illustrated in FIG. 2, the driver's seat 9 comprises two mechanical exciters 13 with one arranged on the right side of the driver's seat 9 and one on the left side of the driver's seat 9.

As illustrated in FIG. 1, a signalling device 14 coupled to the steering wheel 8 and designed to apply mechanical vibrations of variable frequency and intensity to the steering wheel 8 is also provided; thus, when the signalling device 14 is activated, the steering wheel 8 vibrates in a manner that can be clearly perceived by the driver, thus generating a tactile (haptic) feedback. According to a preferred embodiment, the signalling device 14 is virtual (i.e., is constituted by software) and uses the servo system of the steering wheel 8 (i.e., the "drive-by-wire" system of the steering wheel 8) in order to generate the vibrations that act on the steering wheel 8; in other words, the signalling device 14 acts on the actuator of the servo system of the steering wheel 8 (i.e., the "drive-by-wire" system of the steering wheel 8) by controlling the actuator with an undulatory control law.

A signalling device 15 coupled to the accelerator pedal and designed to apply mechanical vibrations of variable frequency and intensity to the accelerator pedal 10 is provided; thus, when the signalling device 15 is activated, the accelerator pedal 10 vibrates in a manner that can be clearly perceived by the driver, thus generating a tactile (haptic) feedback. Preferably, the signalling device 15 comprises a mechanical exciter (also called a "shaker") similar to the mechanical exciters 13 of the signalling device 12 coupled to the driver's seat 9.

A signalling device 16 coupled to the brake pedal 11 and designed to apply mechanical vibrations of variable frequency and intensity to the brake pedal 11 is also provided; thus, when the signalling device 16 is activated, the brake pedal 11 vibrates in a manner that can be clearly perceived by the driver, thus generating a tactile (haptic) feedback. Preferably, the signalling device 16 comprises a mechanical exciter (also called a "shaker") similar to the mechanical exciters 13 of the signalling device 12 coupled to the driver's seat 9.

An electronic control unit 17 ("ECU") is provided that is designed to control the signalling devices 12 and 14-16, i.e. is designed to apply a vibration to the steering wheel 8, to the driver's seat 9 and to the pedals 10 and 11 in the manner described in the following; physically, the control unit 17 can consist of a single device or of a plurality of separate devices that communicate with one another via the CAN network of the road vehicle 1.

Figure 3:
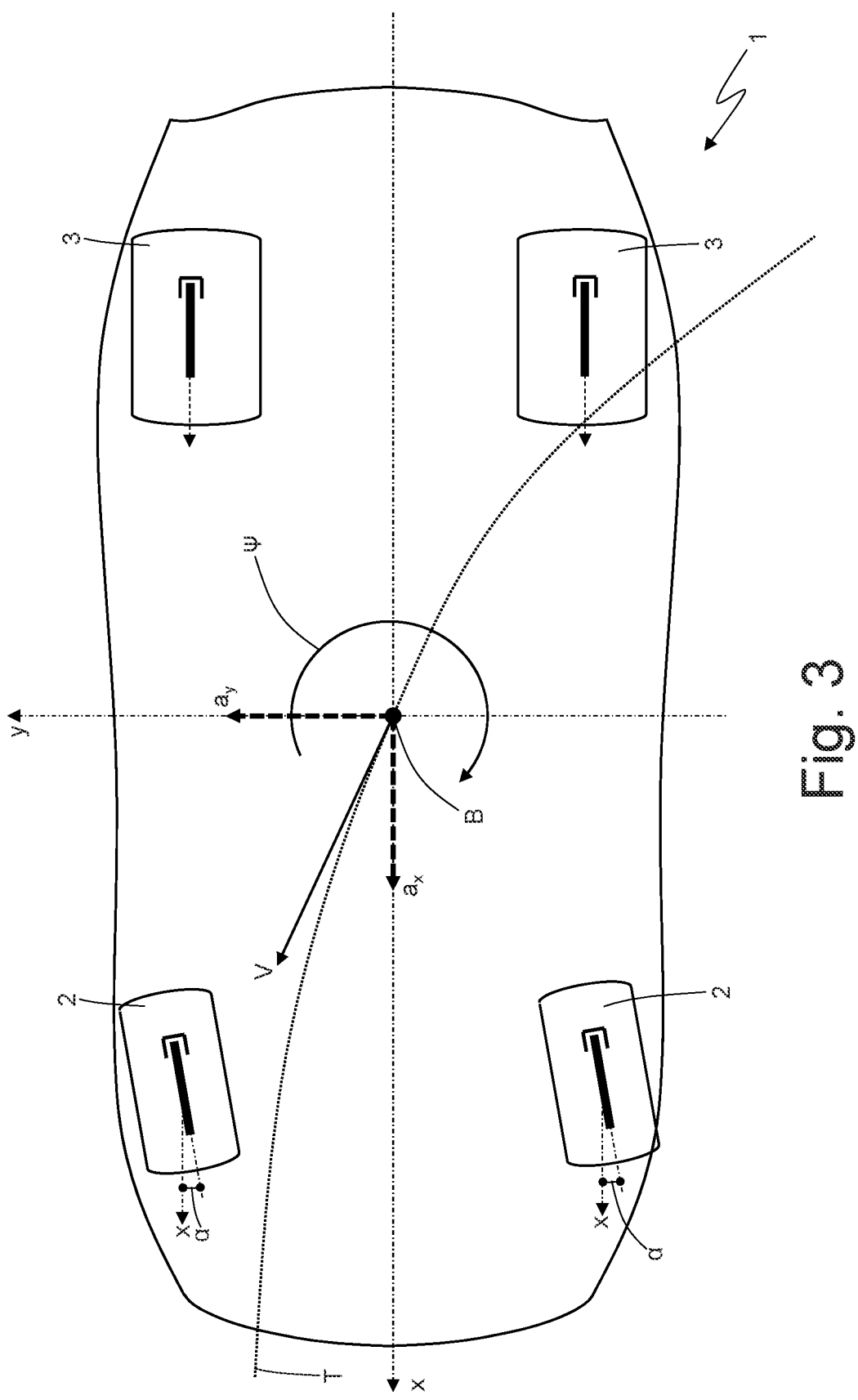
FIG. 3 illustrates, in a schematic plan view of the road vehicle of FIG. 1 driving along a bend, the trajectory, the steering angle of the front wheels, the forward velocity, the accelerations, and the yaw angle.

As illustrated in FIG. 3, while driving along a bend (i.e. when the road vehicle 1 is following a curved trajectory T), the front wheels 2 that steer the vehicle have a non-zero steering angle α (i.e. the angle formed between the longitudinal x-axis of the road vehicle 1 and the direction of the front wheels 2). The road vehicle 1 is also proceeding at a forward velocity V (tangent to the trajectory T) and is subject to a longitudinal acceleration $a_x$ and a transverse acceleration $a_y$. In use, the control unit 17 determines in a known manner (typically by means of a sensor) the actual steering angle α (i.e. real steering angle α actually present in the road vehicle 1) and determines in a known manner (typically by means of a sensor) the forward velocity V and the accelerations $a_x$ and $a_y$.

In use, the control unit 17 determines in a known manner (typically by means of a tri-axial gyroscope) a yaw angle ψ (i.e., the oscillation angle of the road vehicle 1 about a vertical axis passing through the centre of gravity B) and consequently a yaw rate Vψ (dψ/dt), i.e. the variation of the yaw angle ψ over time (the yaw rate Vψ can be determined by deriving the yaw angle ψ over time). Alternatively, the yaw rate Vψ can be measured directly so that the yaw angle ψ can be determined by integrating the yaw rate Vψ over time.

In use, the control unit 17 determines (through the measurements provided by the various sensors with which the road vehicle 1 is provided) an actual dynamic behaviour of the road vehicle 1 due to the driving actions carried out by the driver on the steering wheel 8, on the accelerator pedal 10, and on the brake pedal 11; in particular, the dynamic behaviour of the road vehicle 1 comprises (among other things) the forward velocity V, the accelerations $a_x$ and $a_y$, the steering angle α, and the yaw rate Vψ (or the yaw angle ψ). In addition, in use, the control unit 17 determines an ideal dynamic behaviour of the road vehicle 1 (i.e. a theoretical, desired dynamic behaviour corresponding to an ideal and perfect driving) in the same conditions in which the road vehicle 1 currently is.

In use, the control unit 17 generates a tactile feedback, which can be perceived by the driver (i.e. a haptic signal), if the actual dynamic behaviour of the road vehicle 1 is (significantly) different from the ideal dynamic behaviour of the road vehicle 1. Preferably, a frequency and/or intensity of the tactile feedback is varied as a function of the existing deviation between the actual dynamic behaviour of the road vehicle 1 and the ideal dynamic behaviour of the road vehicle 1; in other words, the greater the existing deviation between the actual dynamic behaviour of the road vehicle 1 and the ideal dynamic behaviour of the road vehicle 1, the greater the frequency and/or intensity of the tactile feedback becomes.

A part of the ideal dynamic behaviour (for example, one that relates to the ability of wheels 2 and 3 to grip the road surface) can be obtained from known algorithms that establish the grip and stability limits of the road vehicle 1: obviously, the ideal dynamic behaviour always involves not exceeding (perhaps approaching but never exceeding) the grip and stability limits of the road vehicle 1. Another part of the ideal dynamic behaviour (for example, one that relates to conditions of oversteering and understeering) can be obtained from a mathematical model of the road vehicle 1 which, receiving a series of data points regarding the dynamics of the road vehicle 1 as input, provides both a prediction (in the very short term, i.e. a second or so at most) of how the dynamics of the road vehicle 1 will evolve as well as the ideal dynamics for maximizing performance (in safety) as output. In particular, the mathematical model is based on transfer functions and is triggered by the forces acting on the road vehicle 1.

According to a preferred embodiment, the control unit 17 determines whether, while braking, the wheels 2 and/or 3 of the road vehicle 1 are losing grip (i.e. are exceeding their grip limit independently of a potential intervention of the ABS system, which may have been disabled in the case of track driving) and generates a tactile feedback, which can be perceived by the driver, if, while braking, the wheels 2 and/or 3 of the road vehicle 1 are losing grip; in particular, the control unit 17 applies a mechanical vibration to the brake pedal 11 (by actuating the signalling device 15) in order to generate a tactile feedback, which can be perceived by the driver, if, while braking, the wheels 2 and/or 3 of the road vehicle 1 are losing grip.

According to a preferred embodiment, the control unit 17 determines whether, while accelerating, the rear drive wheels 3 of the road vehicle 1 are losing grip (i.e. are exceeding their grip limit independently of a potential intervention of the ASR system, which may have been disabled in the case of track driving) and generates a tactile feedback, which can be perceived by the driver, if the rear drive wheels 3 of the road vehicle 1 are losing grip; in particular, the control unit 17 applies a mechanical vibration to the accelerator pedal 10 (by activating the signalling device 16) in order to generate a tactile feedback, which can be perceived by the driver if, while accelerating, the rear driving wheels 3 of the road vehicle 1 are losing grip.

According to a preferred embodiment, the control unit 17 determines whether the road vehicle 1, while driving along a bend, is oversteering or understeering or is about to oversteer or understeer and then generates a tactile feedback, which can be perceived by the driver, if the road vehicle 1, while driving along the bend, is oversteering or understeering or is about to oversteer or understeer.

According to a preferred embodiment, a frequency and/or intensity of the tactile feedback is variable as a function of the extent of the oversteering or understeering; in other words, the greater the oversteering or understeering, the greater the frequency and/or the intensity of the tactile feedback becomes.

In particular, the control unit 17 applies a mechanical vibration to the driver's seat 9 (by actuating the signalling device 12) and/or to the steering wheel 8 (by actuating the signalling device 14) in order to generate a tactile feedback, which can be perceived by the driver, if the road vehicle 1, while driving along the bend, is oversteering or understeering or is about to oversteer or understeer. In this embodiment, the control unit 17 applies the mechanical vibration only to a right portion of the driver's seat 9 if the road vehicle 1, while driving along the bend, is oversteering or understeering or is about to oversteer or understeer to the right; analogously, the control unit 17 applies the mechanical vibration only to a left portion of the driver's seat 9 if the road vehicle 1, while driving along the bend, is oversteering or understeering or is about to oversteer or understeer to the left.

Preferably, the control unit 17 applies a mechanical vibration to the driver's seat 9 (by actuating the signalling device 12) in order to generate tactile feedback, which can be perceived by the driver, if the road vehicle 1, while driving along the bend, is oversteering or is about to oversteer. In addition, the control unit 17 applies a mechanical vibration to the steering wheel 8 (by actuating the signalling device 14) in order to generate a tactile feedback, which can be perceived by the driver, if the road vehicle 1, while driving along the bend, is understeering or is about to understeer. The driver's seat 9 is thus reserved for signalling an oversteering while the steering wheel 8 is reserved for signalling an understeering (alternatively, it could also be vice versa).

In particular, the control unit 17 determines whether the road vehicle 1, while driving along a bend, is oversteering or understeering or is about to oversteer or understeer and then generates (as described in the foregoing) a tactile feedback, which can be perceived by the driver, if the road vehicle 1, while driving along the bend, is oversteering or understeering or is about to oversteer or understeer.

According to a preferred embodiment, the control unit 17 determines (by means of the information received from the sensors installed on board the road vehicle 1) an actual yaw rate $V\psi$ of the road vehicle 1, determines (by means of the mathematical model of the road vehicle 1) an ideal yaw rate $V\psi$ of the road vehicle 1, establishes that the road vehicle 1 is oversteering if the actual yaw rate $V\psi$ is (significantly, i.e., beyond a predetermined threshold) greater than the ideal yaw rate $V\psi$, and establishes that the road vehicle 1 is understeering if the actual yaw rate $V\psi$ is (significantly, i.e., beyond a predetermined threshold) smaller than the ideal yaw rate $V\psi$.

As mentioned above, the control device 17 determines the ideal yaw rate $V\psi$ by using the mathematical model of the road vehicle 1 which, receiving a series of data points regarding the dynamics of the road vehicle 1 as input, provides both a prediction (in the very short term, i.e. a second or so at most) of how the dynamics of the road vehicle 1 will evolve as well as the ideal dynamics for maximizing performance (in safety) as output.

According to a possible embodiment, the control unit 17 estimates (by means of the mathematical model of the road vehicle 1) an actual yaw rate $V\psi$ of the road vehicle 1 in a future instant (which is separated from a current instant by an amount of time ranging from 0.5 to 1.5 seconds), determines (again by means of the mathematical model of the road vehicle 1) an ideal yaw rate $V\psi$ of the road vehicle 1 in the future instant, establishes that the road vehicle 1 is about to oversteer if the actual yaw rate $V\psi$ in the future instant is greater than the ideal yaw rate $V\psi$ in the future instant, and establishes that the road vehicle 1 is about to understeer if the actual yaw rate $V\psi$ in the future instant is smaller than the ideal yaw rate $V\psi$ in the future instant.

According to a preferred embodiment, the haptic signalling modes can be regulated by the driver (thus rendered more or less noticeable or even eliminated altogether) according to his or her driving ability: a less experienced driver will tend to get more help while a more experienced driver will tend to get less help or no help at all. In addition, for example in track driving, the driver may also choose to activate "suggestions" at some points and not in others.

The embodiments herein described can be combined with one another without departing from the scope of protection of the present invention.

The driver assistance method described above has numerous advantages.

First of all, the driver assistance method described above allows the driver to approach (in safety) the limits of the road vehicle 1, inasmuch as the driver receives indications as to when he or she is not exploiting the full potential of the road vehicle 1 in a very clear and intuitive, yet simultaneously non-invasive and non-coercive manner. In essence, the driver assistance method described above gives a "normal" driver the ability (through the sensory signals generated by the control unit 17) to predict a certain amount of time in advance (as a professional driver would) what is happening to the road vehicle 1 in order to be able to correct his or her driving in good time and thus approach the limit of the road vehicle 1 without ever exceeding it.

In addition, the driver assistance method described above still leaves the driver in full control of driving without ever imposing anything on said driver; this way, the driver never feels "coerced" so that he or she always has the perception of being in full control of the road vehicle 1.

Finally, the driver assistance method described above is extremely simple and cost-efficient to implement, inasmuch as it utilizes commercially available components. Also from a "software" point of view, the control method described above requires neither a large computing power nor the occupation of a large amount of memory.

LIST OF REFERENCE NUMBERS IN THE FIGURES

1 vehicle
2 front wheels
3 rear wheels
4 passenger compartment
5 dashboard
6 windshield
7 instrument panel 8 steering wheel
9 driver's seat
10 accelerator pedal
11 brake pedal
12 signalling device
13 mechanical exciter
14 signalling device
15 signalling device
16 signalling device
17 control unit
T trajectory
V forward velocity
$a_x$ longitudinal acceleration
$a_y$ transverse acceleration
B centre of gravity
α steering angle
x longitudinal axis
y transverse axis
ψ yaw angle

The invention claimed is:

1. A method for the driver assistance of a road vehicle (1) and comprising the steps of:
   determining an actual dynamic behaviour of the road vehicle (1) due to the driving actions carried out by a driver on a steering wheel (8), an accelerator pedal (10) and a brake pedal (11);
   determining an ideal dynamic behaviour of the road vehicle (1) in the same conditions in which the road vehicle (1) currently is;
   determining whether, while braking, the wheels (2, 3) of the road vehicle (1) are losing grip or whether, while accelerating, the drive wheels (3) of the road vehicle (1) are losing grip;
   generating a tactile feedback, which can be perceived by the driver, if the actual dynamic behaviour of the road vehicle (1) is different from the ideal dynamic behaviour of the road vehicle (1), i.e. if, while braking, the wheels (2, 3) of the road vehicle (1) are losing grip or if, while accelerating, the drive wheels (3) of the road vehicle (1) are losing grip;
   applying a mechanical vibration to the brake pedal (11) or to the accelerator pedal (10) in order to generate the tactile feedback, which can be perceived by the driver, if, while braking, the wheels (2, 3) of the road vehicle (1) are losing grip or if, while accelerating, the drive wheels (3) of the road vehicle (1) are losing grip.

2. The driver assistance method according to claim 1 and comprising the further steps of:
   determining whether the road vehicle (1), while driving along a bend, is oversteering or understeering or is about to oversteer or understeer; and
   generating a tactile feedback, which can be perceived by the driver, if the road vehicle (1), while driving along the bend, is oversteering or understeering or is about to oversteer or understeer.

3. The driver assistance method according to claim 2 and comprising the further step of applying a mechanical vibration to the steering wheel (8) in order to generate a tactile feedback, which can be perceived by the driver, if the road vehicle (1), while driving along the bend, is understeering or is about to understeer.

4. The driver assistance method according to claim 2 and comprising the further step of applying a mechanical vibration to a driver's seat (9) in order to generate a tactile feedback, which can be perceived by the driver, if the road vehicle (1), while driving along the bend, is oversteering or understeering or is about to oversteer or understeer.

5. The driver assistance method according to claim 4 and comprising the further steps of:
   applying the mechanical vibration only to a right portion of the driver's seat (9), if the road vehicle (1), while driving along the bend, is oversteering or understeering or is about to oversteer or understeer to the right; and
   applying the mechanical vibration only to a left portion of the driver's seat (9), if the road vehicle (1), while driving along the bend, is oversteering or understeering or is about to oversteer or understeer to the left.

6. The driver assistance method according to claim 2 and comprising the further steps of:
   determining an actual yaw rate ($V_\psi$) of the road vehicle (1);
   determining an ideal yaw rate ($V_\psi$) of the road vehicle (1);
   establishing that the road vehicle (1) is oversteering if the actual yaw rate ($V_\psi$) is greater than the ideal yaw rate ($V_\psi$); and
   establishing that the road vehicle (1) is understeering if the actual yaw rate ($V_\psi$) is smaller than the ideal yaw rate ($V_\psi$).

7. The driver assistance method according to claim 2 and comprising the further steps of:
   estimating an actual yaw rate ($V_\psi$) of the road vehicle (1) in a future instant;
   determining an ideal yaw rate ($V_\psi$) of the road vehicle (1) in the future instant;
   establishing that the road vehicle (1) is about to oversteer if the actual yaw rate ($V_\psi$) in the future instant is greater than the ideal yaw rate ($V_\psi$) in the future instant; and
   establishing that the road vehicle (1) is about to understeer if the actual yaw rate ($V_\psi$) in the future instant is smaller than the ideal yaw rate ($V_\psi$) in the future instant.

8. The driver assistance method according to claim 7, wherein the future instant is separated from a current time instant by an amount of time ranging from 0.5 to 1.5 seconds.

9. The driver assistance method according to claim 1, wherein a mechanical vibration is applied to the brake pedal (11) in order to generate a tactile feedback, which can be perceived by the driver, if, while braking, the wheels (2, 3) of the road vehicle (1) are losing grip, and wherein a mechanical vibration is applied to the accelerator pedal (10) in order to generate a tactile feedback, which can be perceived by the driver, if, while accelerating, the drive wheels (3) of the road vehicle (1) are losing grip.

* * * * *